Patented Aug. 5, 1924.

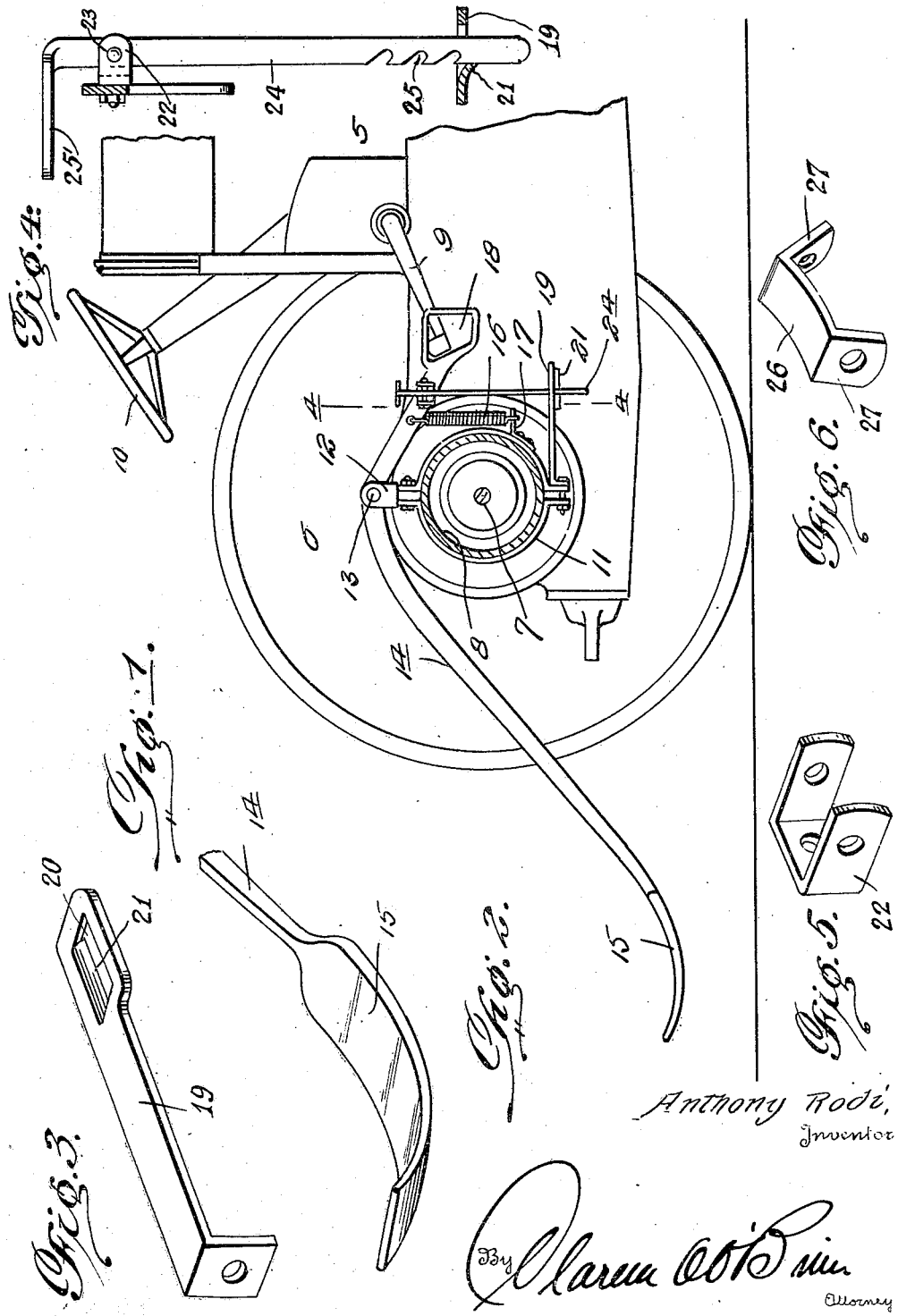

1,503,851

UNITED STATES PATENT OFFICE.

ANTHONY RODI, OF HAMMONTON, NEW JERSEY.

OVERTURNING PREVENTION FOR TRACTORS.

Application filed June 28, 1923. Serial No. 648,197.

*To all whom it may concern:*

Be it known that ANTHONY RODI, citizen of the United States, residing at Hammonton, in the county of Atlantic and State of New Jersey, has invented certain new and useful Improvements in Overturning Prevention for Tractors, of which the following is a specification.

This invention relates to tractor attachments, and has particular reference to means for preventing the overturning of tractors automatically.

It is well known that a commercial type of tractor now in use often overturns when pulling an extremely heavy load or when operating upon a steep incline, thereby causing serious injury and even death to the operator. These accidents could be avoided if the driving connection from the engine to the rear wheels were immediately disconnected as soon as the tractor starts to overturn. It is accordingly an object of the present invention to provide an attachment for tractors whereby this driving connection is automatically disconnected to thereby prevent overturning of the tractor.

An object of the invention is to provide a device of the above kind which will be efficient and reliable in operation and which embodies the desired qualities of simplicity and durability of construction.

A further object of the invention is to provide means adapted to be brought into engagement with the ground when the tractor starts to overturn so as to be thereby actuated for depressing the clutch lever of the tractor for disconnecting the engine from the drive wheels, thereby permitting the tractor to immediately right itself.

Still another object of the invention is to provide means for automatically holding the clutch pedals depressed when actuated by the ground engaging member until said clutch lever is manually released after the tractor is righted.

With the above general objects in view, and others that will become apparent as the nature of the invention is better understood, the same consists in the novel form, combination and arrangement of parts hereinafter more fully described, shown in the accompanying drawings and claimed.

In the drawings, wherein like reference characters indicate corresponding parts throughout the several views, Figure 1 is a fragmentary view showing the rear end portion of a tractor, partly in longitudinal section and equipped with a clutch release device constructed in accordance with the present invention, Figure 2 is an enlarged perspective view of the rear end of the ground engaging lever, Figure 3 is an enlarged perspective view of the keeper for the latch which retains the clutch lever depressed, Figure 4 is an enlarged sectional view taken on line 4—4 of Figure 1, Figure 5 is an enlarged perspective view showing the mounting bracket for the latch, and Figure 6 is an enlarged perspective view of a clamp section by means of which the clamp for attaching the device to the rear axle housing may be enlarged.

Referring more in detail to the drawings, 5 indicates the rear end portion of a well known form of tractor having rear driving wheels 6 which are driven from an axle 7 provided with a housing 8, a clutch lever 9 being provided directly beneath the steering wheel 10, the depression of which is adapted to disconnect the engine of the tractor from the drive wheels.

In accordance with the present invention, a split clamp 11 is bolted on to the axle housing 8 with a bracket 12 fastened between the upper ends thereof, which bracket is provided with a transverse pivot pin 13 upon which a ground engaging lever 14 is mounted for vertical swinging movement. The ground engaging lever 14 is curved rearwardly and downwardly where its free rear end portion is formed as at 15 in the nature of a flat plate of arcuate form with an upturned extreme free rear end portion capable of sliding along the ground without digging into the same. The portion of the lever 14 rearwardly of its pivot 13 is considerably longer than the forward portion thereof so that the weight of the rear end of the lever 14 normally tends to tilt the same for engaging the flat portion 15 with the ground. In order to yieldingly hold the rear end of the lever 14 the proper distance above the ground, but in close proximity thereto, a spring 16 of the helical tension spring type is attached to the forward end of the lever and to a suitable bracket 17 carried by the forward section of the split clamp 11.

The extreme forward end portion of the lever 14 is provided with a relatively large opening as at 18 in which the laterally extending rear end of the clutch pedal 9 is loosely disposed, and it will thus be seen that should the tractor tilt upwardly the rear end portion 15 of the lever will strike the ground so as to cause this lever to be swung about its pivot 13, thereby depressing the clutch pedal 9 and disconnecting the drive wheels from the engine. When this occurs, the overturning tendency of the tractor is relieved, and the tractor will immediately right itself.

It is necessary, however, to provide means for automatically retaining the foot pedal 9 depressed as soon as it is actuated by the lever 14. This means preferably embodies a horizontal forwardly projecting keeper arm 19 attached to the lower portion of the clamp 11 by means of the lower bolt thereof and having its free forward end formed with a slot 20 along one edge of which there is provided a depending inwardly projecting retaining tooth 21. A U-shaped bracket 22 is swiveled to the forward end of the lever 14 just in front of the spring 16, and this bracket has a transverse pin 23 upon which is hinged a suitable pivoted catch 24 whose lower end is provided with a series of notches 25 at its edge adjacent the retaining tooth 21. As the catch 24 lowers with the forward end of the lever 14, the notched portion of the catch will ratchet past the tooth 21 until fully depressed, said catch 24 swinging inwardly to engage one of its notches with the tooth 21 when fully depressed, and thereby retaining the clutch pedal in depressed position. It will be understood that when the catch 24 swings inwardly to engage the tooth 21, it will thereby move toward a true vertical position under the influence of gravity so that its automatic action is insured. The upper end of the catch 24 above the pivot pin 23 is provided with an inwardly extending foot piece 25 by means of which the operator may disengage the catch from the tooth 21 to permit the clutch pedal 9 to again raise when it is desired to continue the forward travel of the tractor.

In some instances, it is desired to mount the lever 14 adjacent the differential housing of the tractor where the rear axle housing 8 is of larger diameter. In order to accommodate the clamp to this change in position, it may be enlarged by the insertion of a clamp section such as shown in Figure 6 embodying an arcuate portion 26 with flanges 27 upon the ends thereof formed with suitable openings to receive bolts for connecting this clamp section between the two parts of the clamp shown in Figure 1. in this way the diameter of the clamp is sufficiently enlarged for the purpose mentioned.

In operation, should the forward end of the tractor start to raise, this will be permitted until the rear end portion 15 of the lever 14 strikes the ground, whereupon continued raising movement of the forward end of the tractor will cause this lever to swing so as to cause depression of the clutch pedal 9. When this takes place the catch 24 lowers through the slot 20 in the keeper 19 and then this catch swings inwardly to engage the tooth 21 in the notch 25 aligned therewith. The clutch pedal is then effectively retained in depressed position until manually released by pressure on the foot piece 25'. As soon as the driving connection between the rear wheels and the engine is broken through depression of the clutch pedal 9, the overturning tendency of the tractors is nullified and in sufficient time to permit the tractor to automatically right itself by lowering of the front end thereof. It is to be understood that when the tractor is in its normal position, the spring 16 will aid in holding the foot 15 of the rear end of the lever 14 out of engagement with the ground, the spring further holding the forward end of the lever in such a manner as not to depress the clutch pedal 9 whereby the latter will disconnect the drive wheels of the tractor from the engine. Through the construction described, the operation of tractors of this kind is made perfectly safe and considerable injuries and death prevented.

It is believed that the construction and operation of the present invention will be readily understood and appreciated from the foregoing description.

Minor changes may be made without departing from the spirit and scope of the invention as claimed.

What I claim as new is:

1. In combination with a tractor, wherein the driving wheels are disconnected from the engine by a depressible pedal, a lever operatively engaged with the clutch pedal and pivotally mounted for vertical movement, said lever being engageable with the ground upon starting of overturning movement of the tractor for causing its swinging movement to depress said clutch pedal, and means to automatically retain the clutch pedal depressed when actuated by swinging of the lever, said means embodying a laterally swingable latch pivoted to the forward end of the lever, and yieldable means for normally holding the lever positioned with its rear end slightly spaced above the ground.

2. In combination with a tractor, wherein the driving wheels are adapted to be disconnected from the engine by the depression of the clutch pedal thereof, a lever pivotally supported intermediate its ends on the tractor and adapted for vertical swinging movement thereon, the lever having the rearwardly extending portion thereof forming a ground engaging means, the forward end of said lever being loosely engaged with the clutch pedal, the forward end of said lever adapted to depress the clutch pedal when the rear end of the lever engages the ground when the forward end of the tractor moves upwardly, yieldable means for normally holding the lever in an inoperative position, and means for retaining the forward end of the lever in engagement with the clutch pedal whereby the clutch pedal is automatically retained in its depressed position, said means comprising a latch bar pivotally carried by the forward end of said lever, the lower end of said latch bar having a plurality of teeth formed in one of the longitudinal sides thereof, a horizontally extending bar supported on the tractor and having an opening in the outer free end thereof for receiving the lower end of said latch, and a keeper co-operating with said opening and adapted to engage the teeth on said latch.

3. In combination with a tractor, wherein the driving wheels are adapted to be disconnected from the engine by the depression of the clutch pedal thereof, a lever pivotally supported intermediate its ends on the tractor and adapted for vertical swinging movement thereon, the lever having the rearwardly extending portion thereof forming a ground engaging means, the forward end of said lever being loosely engaged with the clutch pedal, the forward end of said lever adapted to depress the clutch pedal when the rear end of the lever engages the ground when the forward end of the tractor moves upwardly, yieldable means for normally holding the lever in an inoperative position, means for retaining the forward end of the lever in engagement with the clutch pedal whereby the clutch pedal is automatically retained in its depressed position, said means comprising a latch bar pivotally carried by the forward end of said lever, the lower end of said latch bar having a plurality of teeth formed in one of the longitudinal sides thereof, a horizontally extending bar supported on the tractor and having an opening in the outer free end thereof for receiving the lower end of said latch, a keeper co-operating with said opening and adapted to engage the teeth on said latch, and means associated with the upper end of said latch for releasing the same from engagement with said keeper whereby the clutch pedal will be returned to its normal position to connect the drive wheels with the engine.

In testimony whereof I affix my signature.

ANTHONY RODI.